United States Patent [19]

White

[11] 4,067,667
[45] Jan. 10, 1978

[54] CONTROLLED STROKE ELECTRODYNAMIC OSCILLATING MOTOR COMPRESSOR

[75] Inventor: Harlan Vernon White, Scotia, N.Y.

[73] Assignee: Mechanical Technology Incorporated, Latham, N.Y.

[21] Appl. No.: 656,575

[22] Filed: Feb. 9, 1976

Related U.S. Application Data

[63] Continuation-in-part of Ser. No. 467,848, May 8, 1974, Pat. No. 3,937,600.

[51] Int. Cl.² .................. F04B 35/04; F01B 11/02
[52] U.S. Cl. ............................. 417/418; 417/416; 92/85 B; 92/143
[58] Field of Search .............. 417/416, 417, 418; 92/85 B, 8, 143; 123/46 R, 46 A, 46 SC; 290/1 R; 310/27, 30

[56] References Cited

U.S. PATENT DOCUMENTS

| 1,129,964 | 3/1965 | Ebeung | 92/85 B |
| 2,721,453 | 10/1955 | Reutter | 417/418 |
| 3,543,061 | 11/1970 | Wallace | 417/417 |

FOREIGN PATENT DOCUMENTS

| 834,125 | 2/1952 | Germany | 417/417 |
| 850,991 | 10/1960 | United Kingdom | 417/418 |

Primary Examiner—Carlton R. Croyle
Assistant Examiner—Thomas I. Ross
Attorney, Agent, or Firm—Joseph V. Claeys

[57] ABSTRACT

A compressor of the free-piston resonant type driven by an electrodynamic oscillating motor incorporates means to control the stroke to allow for stable operation over a wide range of operating conditions. The spring-mass system of the compressor which is forced into vibration by the electrodynamic oscillating motor is arranged to have a selectively variable natural resonant frequency generally centered on the power line frequency. Variable area port means responsive to any overstroking are operative to vary the natural frequency of the spring-mass system by varying the stiffness of a gas spring means thereof so as to oppose overstroking and also provide for a maximum stroke limit.

24 Claims, 14 Drawing Figures

CONTROLLED STROKE ELECTRODYNAMIC OSCILLATING MOTOR COMPRESSOR

This is a continuation-in-part of the co-pending application entitled "Controlled Stroke Electrodynamic Linear Compressor," Ser. No. 467,848 filed May 8, 1974, now U.S. Pat. No. 3,937,600.

BACKGROUND OF THE INVENTION

The present invention relates generally to resonant free-piston type compressors and more particularly to such compressors which derive their motion from an electrodynamic oscillating motor.

In free-piston type devices to which the present invention relates the stroke is subject to certain variations since the piston is not guided in a fixed path by a mechanical means, such as a crank drive. This is an especially serious problem in free-piston resonant compressors where the piston derives its oscillating motion from an electrodynamic oscillating motor in that such compressors are only conditionally stable and instabilities in supply voltage or in the load will cause overstroking. That is, the piston stroke varies as a function of operational characteristics such as line voltage, characteristics of the compressed fluid, and the like.

In the past the variation of piston stroke with the compressor load has been a major problem. For example, as the compressor load increases there is a marked and undesirable decrease in the amplitude of the stroke. Also, if the compressor load decreases, there are no restraining forces acting upon the movable system and the amplitude of oscillation will increase until the piston strikes the cylinder head. One prior art approach to solving the overstroking problem was to provide for an enclosed volume of gas at the head of the cylinder which acted as a dash-pot to provide a gas cushion and prevent excessive overtravel. This is not an acceptable solution, however, since if the volume is of sufficient size to be effective, it adversely affects the volumetric efficiency of the compressor. While stroke control can be achieved with complicated electrical control means, this adds to the complexity and cost of the system and is not a satisfactory or acceptable solution either.

The desired stroke control is achieved in an entirely satisfactory manner in the foregoing referenced co-pending application by varying the stiffness of an enclosed volume of gas which acts as the resilient means of the resonant spring-mass system in accordance with the position of the piston.

It has been found desirable not only to provide for control of the maximum stroke limit but also to provide for a controlled variation of the stroke over varying limits. For example, it is desirable when the compressor is employed in a heat pump application to allow the stroke to change in order to properly function over a very wide range of load conditions. That is, in order to achieve a desired overall operating characteristic it may be necessary that the compressor operate with a shorter stroke at one compressor load condition and a longer stroke at another load condition. In one particular application for example, it is necessary that the compressor operate with a stroke of about 0.75 inch at one load condition and with a stroke of about 1.1 at another load condition. For stable operation it is necessary that although the stroke is allowed to vary over such limits it does so in a controlled manner and with a maximum overstroke limit under any operation condition.

SUMMARY OF THE INVENTION

Briefly stated, in accordance with one aspect of the invention, the compressor includes a fluid displacing member, such as a piston, which derives its motion from an electrodynamic oscillating motor. The motor armature and the fluid displacing member are arranged and operatively associated with resilient means, which includes a gas spring means, to provide a resonant mechanical system. The compressor also includes means for varying the stiffness of the gas spring means as a function of the oscillation amplitude of the mechanical system. In a specific arrangement port means are provided to communicate the gas spring means with a source of gas at higher pressure and which port means is responsive to the amplitude of the oscillation to provide for an increase in port area in communication with the source of gas as a function of increase in amplitude beyond a preselected level.

BRIEF DESCRIPTION OF THE DRAWINGS

The novel features believed characteristic of this invention are set forth with particularity in the appended claims. The invention itself, however, both as to its organization and method of operation together with further objects and advantages thereof may best be understood by reference to the following description taken in conjunction with the accompanying drawings and in which:

DETAILED DESCRIPTION

Figure 1:
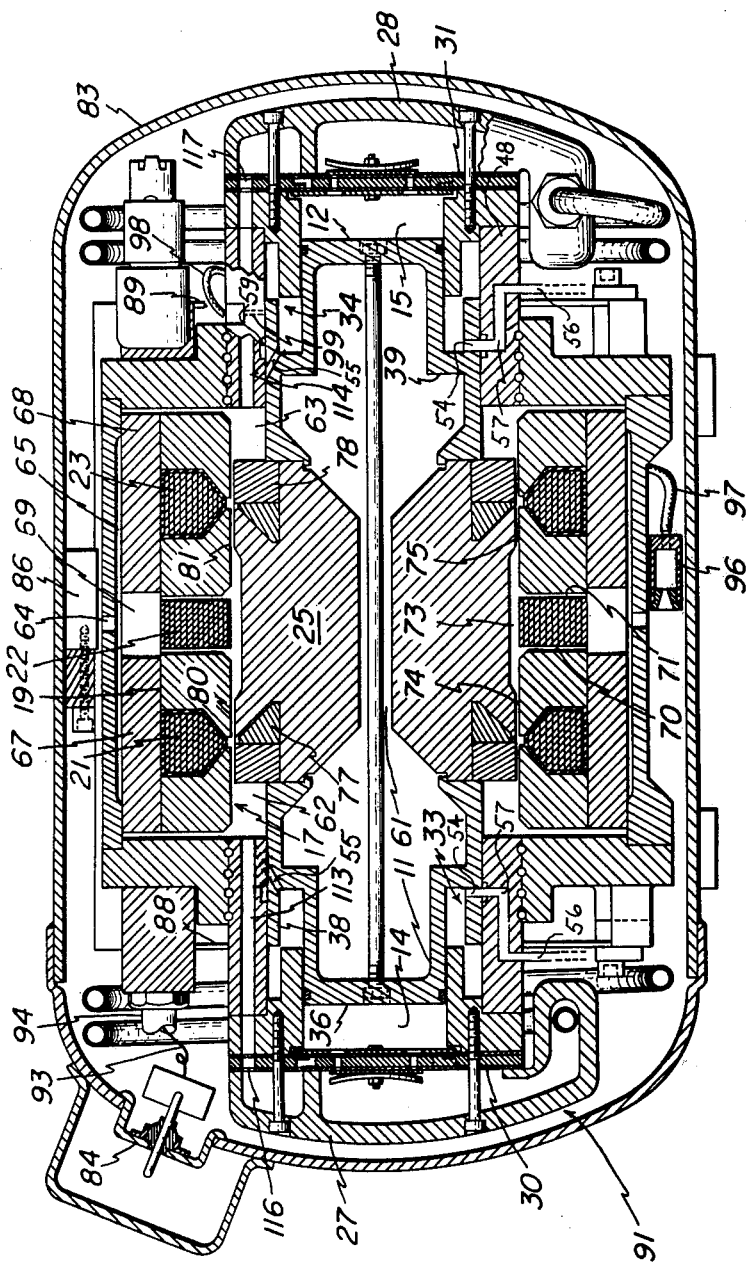
FIG. 1 is a section view of a resonant piston compressor in accordance with one aspect of this invention.

In FIG. 1 there is illustrated a resonant compressor constructed in accordance with one embodiment of the invention. As shown, the compressor includes a pair of oppositely directed pistons 11 and 12 disposed within respective cylinders 14 and 15. Pistons 11 and 12 are arranged to be driven reciprocally within the cylinders 14 and 15 by an electrodynamic oscillating motor, generally designated at 17. To this end, pistons 11 and 12 are coupled to opposite ends of the armature of motor 17 and receive their motion from it.

Preferably, motor 17 is of the type disclosed in U.S. Pat. No. 3,891,874. Accordingly, motor 17 includes a stator 19 having coils 21, 22, and 23, and an armature 25 mounted for oscillation back and forth within the stator 19. Coils 21 and 23 are adapted to be connected to a suitable source of alternating current and coil 22 to a suitable source of direct current. When the coils are so energized they effect reciprocation of the armature 25 in synchronism with the frequency of the alternating current source. Short circuited coils 26 are provided in each of the spaced-apart poles of armature 25 to cancel out undesired alternating flux so as to provide a motor with improved operating characteristics and power factor as more fully described in U.S. Pat. No. 3,891,874.

Oscillating compressors also require a spring means which acts with the movable members to form an oscillating spring-mass system in resonance with the oscillating drive means. To this end, pistons 11 and 12 and motor armature 25 are arranged and operatively associated with gas spring means 33 and 34 to form the oscillating spring-mass system in resonance with the electrodynamic oscillating motor.

Pistons 11 and 12 each comprise a radially spaced apart working plunger 36 and gas spring plunger 38. Working plungers 36 of pistons 11 and 12 are disposed within respective working cylinders 14 and 15. Similarly, gas spring plungers 38 are disposed in respective gas spring cylinders 33 and 34. As shown, pistons 11 and 12 each comprise two portions defining the working plunger 36 and gas spring plunger 38 connected to the working plunger by annular member 39. The working plungers 36 are slidably reciprocal in working cylinders 14 and 15 defined by annular working cylinder wall member 41 and valve plate 30. Suitable sealing means, such as piston rings 42, are provided to effect the desired sealing between the piston and the cylinder walls. In the particular arrangement illustrated in the drawings, the gas spring cylinders 33 and 34 each comprise two chambers 44 and 49. The first chamber 44 is defined by annular recess 46 in working cylinder wall member 41 and the gas spring cylinder wall member 48. The second chamber 49 is defined by the inside wall 51 of gas spring plunger 38 and the outside wall 52 of working plunger 36. In operation, gas spring plunger 38 reciprocates in the first chamber 44 and the working cylinder wall member 41 reciprocates in the second chamber 49. In the foregoing arrangement the second chamber 49 moves with the piston while the cylinder wall member 41 which acts as the plunger is stationary. The gas springs 33 and 34 are provided with piston controlled porting means 54 and 55 which function in a manner to be described in more detail hereinafter to effect the stroke control of the present invention.

For many applications it is desirable or necessary to provide a sealed enclosure for the compressor components, preferably an hermetically sealed enclosure. While any suitable support and housing means may be employed, the generally symmetrical housing 83 illustrated in FIG. 1 is convenient. The housing is provided with a suitable feed-through bushing 84 for the connection of electrical conductors for supplying power to the electrodynamic motor 17. Motor 17 is supported within the housing 83 by a suitable bracket 86 and supporting straps 88 and 89. The foregoing arrangement is adapted to allow a limited freedom of movement of the compressor unit, designated generally at 91, with respect to the housing 83 for the suppression of vibration and noise transmission. Suitable flexible electrical conductors 93 are connected from the feed-through bushing 84 to the motor terminal block 94.

A suitable oil pump 96 is also provided to provide for the desired lubrication of the sliding surfaces of the compressor especially the piston-cylinder wall interface. Conveniently, a differential orifice pump may be utilized to take advantage of the natural vibration of the compressor to effect the pumping. The lubricant is pumped through means, such as flexible tubing 97, from the bottom of the housing to a nozzle 98 where it is applied to the relatively movable surfaces through suitable passages 99.

Conveniently the uncompressed fluid which fills the housing 83 during operation may be utilized to provide cooling for the electrodynamic linear motor. To this end, the compressor is provided with circumferentially spaced apart bores 64 which communicate the interior of housing 83 with an annular cavity 65 which surrounds the stator 19. Passages 69 are provided in the space between partial stator laminations 67 and 68 at selected intervals and are operative to communicate annular cavity 65 with passages 70 and 71 on either side of motor coil 22 to provide cooling therefor. Passages 70 and 71 communicate with a second irregularly-shaped annular cavity 73 which surrounds the motor armature 25. Annular gaps 74 and 75 between armature poles 77 and 78 and stator poles 80 and 81 respectively communicate second annular cavity 73 with annular cavities 62 and 63. Annular cavities 62 and 63 provide the reservoir of fluid for the porting functions of the invention and additionally communicate with manifold-cylinder heads 27 and 28 through bores 113 and 114 and valve plate bores 116 and 117.

Figure 6:
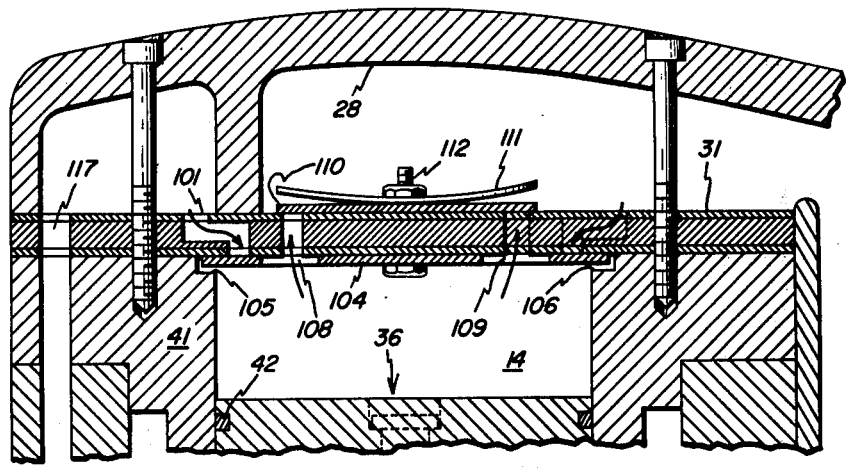
FIG. 6 is a section view of the valve plate and associated cylinder head manifold used in one embodiment of the invention.

FIG. 6 is an enlarged fragmentary view showing the valve means and compressor intake and discharge passages. As shown, fluid enters the working cylinder 14 through passage 101 when intake valve leaf 104 is opened. Valve leaf 104 is restricted in its travel by stops 105 and 106 in working cylinder wall member 41. Pressurized fluid is exhausted from working cylinder 14 through passage 108 and 109 past exhaust valve leaf 110 which is restricted in its movement by rigid restricted member 111. Restraining member 111 exhaust leaf 110 and intake leaf 104 are anchored to the valve plate by suitable means as for example bolt 112.

In accordance with this invention means are provided for selectively adjusting the stiffness of the gas spring means as a function of the oscillation amplitude of the movable system to control such amplitude in a desired manner. To this end, the compressor is provided with port means which selectively communicate the gas spring means with a source of gas at higher pressure. The port means are responsive to the amplitude of oscillation and effect such communication when the amplitude exceeds a predetermined level; the port area in communication with the gas source increasing as a function of increase in amplitude beyond such level.

In the arrangement illustrated in the drawings, the desired stroke control is achieved by two sets of ports 54 and 55. The ports 54 interconnect the gas spring means 33 and 34 at an intermediate position of the piston to equalize the pressures therein and the ports 55 selectively communicate a respective gas spring means 33 or 34 with the source of gas at higher pressure to provide for the stiffening of such gas spring means when and as desired.

In the particular compressor arrangement illustrated in FIG. 1, the pistons and gas spring means are arranged in oppositely disposed pairs. While this is a convenient and desirable arrangement for the compressor, it will be understood by those skilled in the art that the stroke control means of this invention is applicable to any other suitable oscillating compressor arrangement. For example, the oscillating members may be mounted between two oscillating gas spring means or a gas spring means may be mounted on either side of the oscillating members. It is to be understood, therefore, that the description of the invention in connection with the compressor arrangement illustrated in FIG. 1 is by way of example only.

A single gas spring means has a large bias force so it is convenient to arrange the gas springs in matched opposing pairs as in the arrangement of FIG. 1. In such an arrangement, however, the end-of-stroke porting technique illustrated has a destabilizing effect if one side ports and the other side does not. Thus, it is necessary to use midstroke porting to give the gas spring means 33 and 34 a centering reference and equalize the porting inflow. With a different compressor piston-gas spring arrangement midstroke porting may not be a necessary requirement.

In the particular arrangement illustrated in FIG. 1, the desired midstroke porting function is achieved by means of port means 54, passages 57, and conduit means 56 which operate to effect the required pressure equalization in gas springs 33 and 34.

Figure 2:
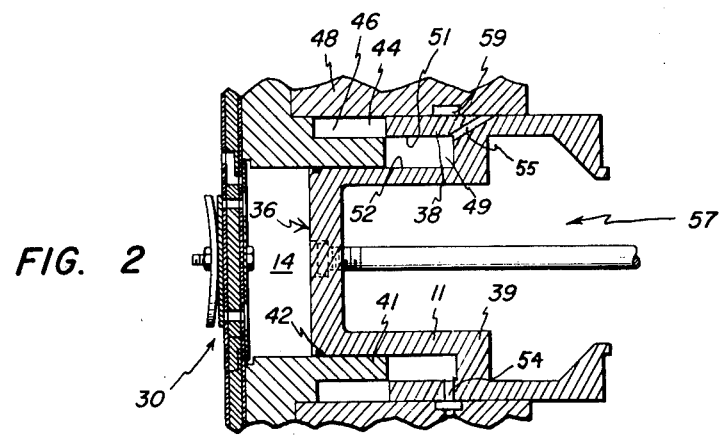
FIG. 2 is a detailed sectional view of one cylinder of the compressor along with the associated piston in a midstroke porting relationship.

To this end, pistons 11 and 12 are each provided with a plurality of circumferentially spaced apart ports 54. The ports 54 extend from the second gas spring chamber 40 of each of the gas spring means 33 and 34 and through the piston wall member 51 to a circumferential groove 59 in the wall 48 of the cylinders 14 and 15. The groove 59 in the wall of cylinder 14 is connected to the groove 59 in the wall of cylinder 15 by suitable passages 57 and a conduit means 56. As shown in FIGS. 1 and 2, when the pistons 11 and 12 are in their mid-stroke positions, the gas spring means 33 and 34 are in communication with each other over conduit means 56, passages 57 and ports 54 so that their pressures are equalized.

The desired stroke control is effected by the end-of-stroke port means 55. The ports 55 also extend from the second gas spring chamber 49 of each of the gas spring means 33 and 34. Ports 55 are angled upward from the plane of the gas spring cylinder wall, as shown, such that at overstroke conditions the outboard ends thereof extend beyond the cylinder walls and communicate with the cavities 62 and 63 associated, respectively, with pistons 11 and 12. The operating conditions of the compressor are such that the pressure in gas spring means 33 and 34 is lower than the ambient in cavities 62 and 63 at the "bottom dead center" position of the piston (and any overstroked condition) for all design conditions.

Figure 3:
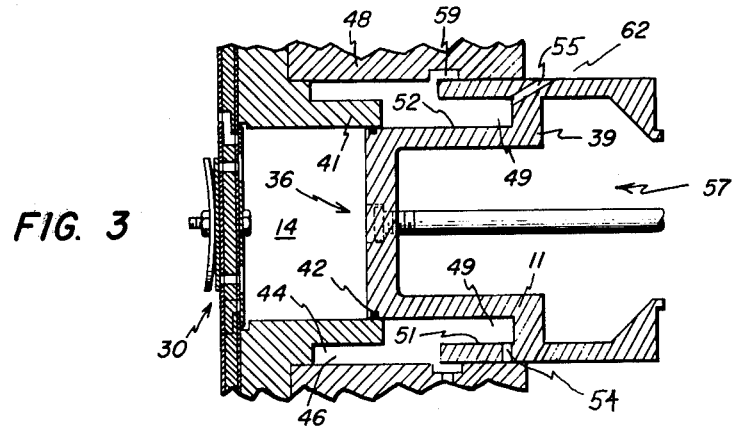
FIG. 3 is another detailed sectional view of one cylinder of the compressor along with the associated piston in an end of stroke porting relationship.

The overstroking compensation of the invention may be best be understood by referring now to FIG. 3 wherein the assembly of FIG. 2 is shown in a position wherein the piston is most fully withdrawn from the cylinder, at "bottom dead center". In that position the ports 54, which in the mid-stroke position communicated the second gas spring chamber 49 with the circumferential groove 59, are blocked by the cylinder wall. The ports 55, which provide communication with the gas spring cavity 49 through the wall of piston 11, however, are now effective in this overstroked position to admit fluid to the gas spring cylinder 49 from the annular region 62 or 63 (FIG. 1) which contains pressurized fluid. Accordingly, since fluid in the cavities 62 and 63 is at a higher pressure than that in gas spring means 33 and 34 at the end-of-stroke position, fluid flows from the cavities 62 and 63 and through the ports 55 into the second gas spring chamber 49 whenever the piston stroke increases to such an extent that the ends of the ports 55 communicate with the cavitites 62 and 63. In such event, there will be an increase in the stiffness of the gas spring means 33 and 34. Since in accordance with this invention the area of port means 55 in communication with cavities 62 or 63 increases in the direction of such overstroking, increased fluid flow is effected as needed to achieve the desired stiffness to provide stroke control.

Operation of the porting means 54 and 55 to provide the desired stroke control may best be described with reference to FIGS. 2, 3 and 4 — wherein piston 11 and its associated cylinder are shown in fragmentary enlarged sectional views of the midstroke, and two extreme end-of-stroke positions.

FIG. 2 shows the piston in the mid-stroke position. In this position the ports 54 are aligned with the groove 59 in the cylinder wall 48. As shown in FIG. 1, the grooves 59 of the oppositely disposed gas springs 33 and 34 are connected together by means of the passages 57 and the conduit means 56 so that when the pistons are at this mid-stroke position the gas springs 33 and 34 are interconnected resulting in an equalization of the gas pressures therein.

Figure 4:
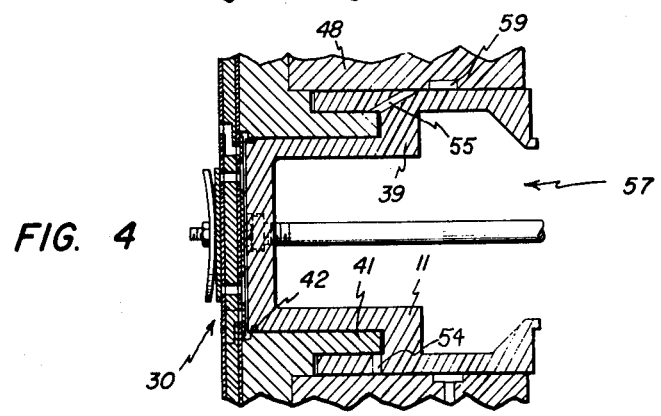
FIG. 4 is yet another detailed sectional view of one cylinder of compressor in fully stroked relationships.

Referring now to FIG. 4, the piston 11 is shown in the position of maximum penetration into the cylinder 14, as would occur due to a perturbation in line voltage or decrease in load, for example. The ports 54 and 55 are both blocked by cylinder wall member 48, and there is no communication with the grooves 59 or the cavities 62 or 63. The opposing piston 12 is in the position shown in FIG. 3, and the pressure in its gas spring cylinder 34 has increased as was described. In the particular arrangement shown in FIG. 1, pistons 11 and 12 are arranged symmetrically. Accordingly, when the instant piston 11 subsequently reaches the midstroke position, piston 12 also reaches the midstroke position and gas spring cylinders 33 and 34 will communicate through the passages and conduit means hereinbefore described, and the pressures (stiffness) of the gas springs will equalize at a value higher than previously, thus raising the resonant frequency of the spring mass system to provide the desired stroke control. If the perturbation is momentary and does not reoccur, normal leakage along the gas spring walls tend to reduce the pressure in the gas spring cylinders to its previous value. Should the perturbation continue, the pressure in the gas spring cylinders will continue to increase, further increasing the resonant frequency of the system until an acceptable stroke length is obtained through phase changes in the mechanical and electrical relationships as well be described.

As described, for many applications some variation in stroke length is desirable to provide for a desired mode of operation over varying operating conditions. For example, at one operating condition where the pressure differential between cavity 62 or 63 and the gas spring chamber is large, only a small port area in communication with such cavity is necessary to allow sufficient fluid flow to achieve the desired gas spring stiffening. On the other hand, at another operating condition where the pressure differential is smaller such a small area port may not allow sufficient fluid flow to sufficiently stiffen the gas spring to provide control of the stroke and undesirable overstroking may occur.

In accordance with this invention the ports 55 are so shaped that more port area communicates with the higher pressure gas source as the stroke increases beyond a predetermined "normal" operating length. With this arrangement as piston overstroke continues, a larger port area is uncovered so that, although the stroke length is allowed to increase from the "normal" operating length, at some desired maximum stroke length a large enough port area will have been placed in communication with the higher pressure gas source to provide the maximum stroke limit. Accordingly, the port means 55 may comprise single ports of variable area configuration or a plurality of small ports whose size and/or number and location are suitably selected so that the desired result is achieved. That is, more port area is available for communication between the gas spring chambers and the source of gas at higher pressure as the stroke length increases beyond the predetermined "normal" operating length.

Figure 5:
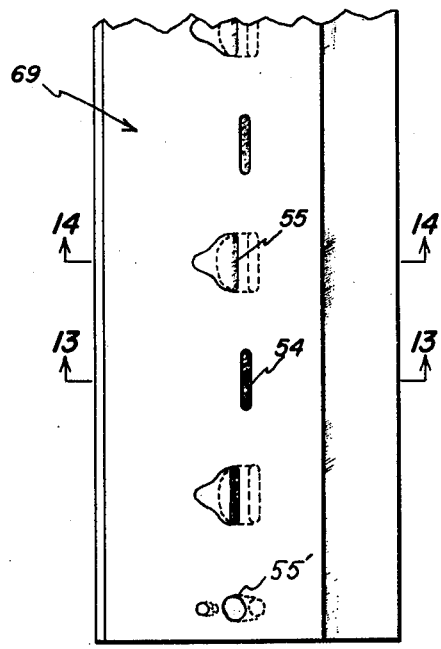
FIG. 5 is a developed view of one piston.
Figure 13:
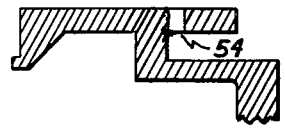
FIG. 13 is a section of FIG. 5 showing one type of port.
Figure 14:
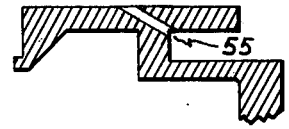
FIG. 14 is a section of FIG. 5 showing the other type of port.

Referring now to FIG. 5 an unwrapped or developed view of the piston is shown wherein the ports 54 and 55 are illustrated in more detail. As shown, the ports 55 are of a generally triangular configuration. It is evident that such port shape readily provides for increasing cross-sectional port area in the direction of piston stroke beyond the predetermined "normal" operating length. The shape of the ports 55 determines the rate of flow of fluid into the gas spring cylinders. Alternatively, a plurality of variable size and/or number openings, as illustrated at 55' of FIG. 5, may be employed as such plural openings will also allow for an increasing fluid flow area with increase in stroke length beyond the "normal" operating length. Different port shapes will provide for more or less gradual transitions as desired.

The foregoing described invention provides stroke control and stability at a given operating condition by reducing energy and force input to the spring-mass system from the motor if a perturbation moves the motorcompressor above its match point stroke and vice versa. This mode of operation is different and is to be contrasted with the prior art type of dash-pot or other damping arrangements or with arrangements which effect a detuning of the system which leaves the driving force high but applies it ineffectively and so still incursh high I²R losses in the electrodynamic oscillating motor.

In addition, the invention makes is possible to maintain a given operating point within a narrow nominal operating range in the face of a disturbing factors such as load or line voltage variations, tolerances, and operational changes in dimension, resistance and the like. Further, the invention makes it possible to pattern the length of stroke at which the compressor will operate over a wide range of varying compressor conditions.

The curve of match point operation can be tailored by appropriate selection of the shape, location, size, etc. of the port means to provide control for a longer stroke at low pressure conditions and a shorter stroke at high pressure conditions.

The latter feature is especially useful when the compressor is utilized in a heat pump application. For example, in such heat pump applications it is desirable to increase the mass flow as the outside temperature drops, increasing the heating load. The lower outside temperature, however, also lowers the gas pressure and the gas density entering the compressor which requires increased volume flow to maintain or increase mass flow. As described, this is accomplished with the present invention by providing a suitable variable area porting means which achieves the desired stroke control while at the same time allowing for the required increase in stroke at the lower pressure, lower gas density condition.

The manner in which the passive and extremely simple porting means for stiffening the gas spring means operates to provide for the desired stroke control may best be understood from the following description and discussion of the principles of operation of the electrodynamic motordriven resonant compressor and the inter-relationship and interaction of the spring-mass system and the mechanical, electrical and electromagnetic characteristics thereof.

Figure 7:
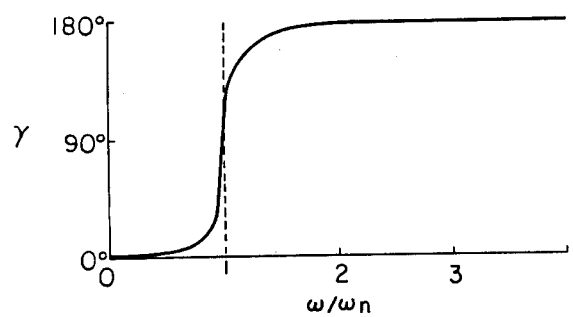
FIG. 7 is a graphical representation of the relationship between the angle through which the displacement lags the driving force and the ratio of the natural frequency to the driving force frequency.

The combination of the mass of the electrodynamic oscillating motor piston assembly with the spring characteristics of the working cylinder and gas spring means forms a conventional spring-mass oscillating system. FIG. 7 shows the relationship between the angle ($\gamma$) through which the displacement lags the driving force, and the ratio of the natural frequency ($wn$) to the driving force frequency ($w$).

When the driving force frequency is equal to the natural frequency, $w/wn$ equals 1 and the system is said to be resonant. At this point the displacement lags the driving force by 90°. Ignoring for a moment any damping forces, the displacement of such a spring mass system is described by the equation:

$$x = X \sin w\, t.$$

where $x$ is the displacement, $X$ is the stroke, $w$ is the angular velocity and $t$ is the time.

The velocity ($v$) is described by:

$$v = w X \cos w\, t.$$

Figure 8:
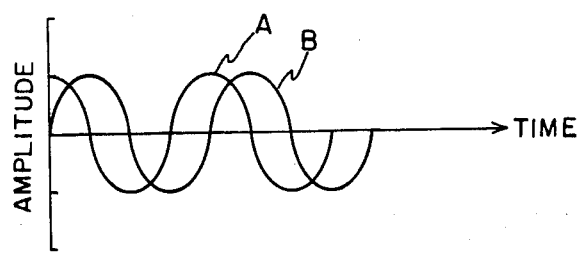
FIG. 8 is a graphical representation of the displacement and velocity of a driven mass spring resonant system with respect to time.

Referring now to FIG. 8 where displacement and velocity are plotted with respect to time it can be seen that velocity A leads displacement B by 90°.

Recalling that at resonance, when $w/wn = 1$, the displacement lags the driving force by 90°, it can be seen that the velocity and the driving force are in phase at resonance.

At resonance, absent any overriding considerations, the amplitude of oscillating will be maximized, diminishing rapidly as the driving force frequency deviates from the design natural frequency.

In accordance with one aspect of the present invention, the spring portion of the mass-spring resonant system comprises two elements: a working cylinder, and a gas spring cylinder. There is an important distinction between mechanical spring and gas springs formed by valved cylinders. Mechanical springs provide an increasing restoring force directly proportional to displacement. A valved cylinder has a stiffness $K$ expressed as:

$$K = (\text{Force/Amplitude})$$

During compression, but before valve opening, the force which is proportional to the pressure multiplied by the area of the piston, increases non-linearly as the amplitude increases. When the pressure has increased to the point of valve opening, it ceases to increase and remains constant. Since the amplitude continues to increae, the stiffness decreases, and the natural frequency of the spring mass sytem is reduced. Moreover, a gas spring is nonlinear and there is no fixed natural frequency for any oscillating system with a nonlinear spring.

In order to completely understand the operation of the present invention we now consider the characteristics of the electrodynamic oscillator motor.

The driving force of an electrodynamic oscillating motor is proportional to the current drawn by it. To determine this current it is convenient to consider the various voltages associated with the electrodynamic oscillating motor, and the phase relationships among them.

The line voltage is a constant. It is the vector sum of three component voltages, a first voltage which is the product of the current supplied and the resistance of the motor windings, a second voltage which is the product of the current supplied and the inductive reactance of the motor windings, and a third load voltage created by the linking and unlinking of the coils by the magnetic flux circulating in the motor.

The third voltage, hereinafter called the load voltage, is necessarily in phase with the velocity of the electrodynamic oscillating motor armature. The driving force applied to the armature is created by and is phased with the current supplied to the motor AC coils.

It can be seen therefore that the angle in the mechanical system through which the velocity lags the driving force is identical to the angle in the electrical system through which the load voltage lags the current. It is this relationship which allows the system to be operated in a stable mode as will now be described.

Figure 9:
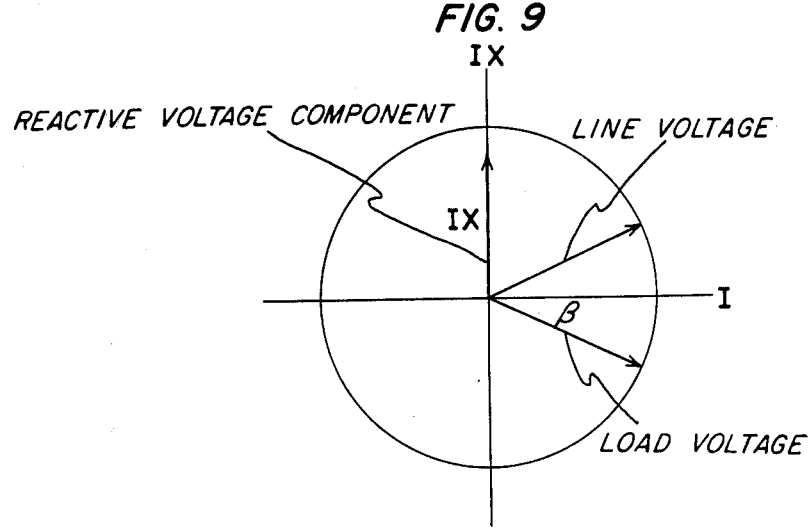
FIG. 9 is a vector representation of the relationship among the various volages and currents of the compressor.
Figure 10:
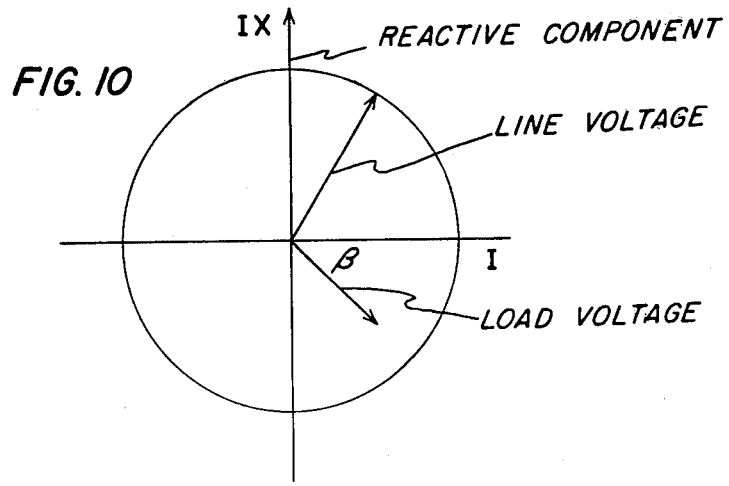
FIG. 10 is another vector representation of the relationship among the various voltages and currents of the compressor.

Referring now to FIGS. 9 and 10 the line voltage is represented by a vector terminating on a constant radius circle. The first voltage will not be considered as it is relatively small and the principles to be considered here are equally well understood without it. The second voltage is represented by the vector IX. The third voltage is represented by the indicated load voltage vector.

Consider the load voltage. It can be described generally by the equation:

$$E = Blv$$

wherein $B$ is the flux of the magnetic field which links and unlinks the coil, $l$ is the effective length of the coil in the field, and $v$ is the relative velocity of the coil and field.

Consider now the effect of a perturbation in the stroke resulting in an overstroke. As has been indicated, overstroking results in a decrease in the spring constant of the system, and a consequent decrease in the natural frequency. Since the frequency of the driving voltage is invariate, an off resonant condition results and the amplitude of the stroke should be reduced. A second consequence of the increased stroke must be considered however. The reduction in natural frequency of the spring-mass system will result in a lag of velocity of the mass with reference to line voltage. This lag produces a similar lag of load voltage. Referring now to FIg. 10, it will be noted that an increased lag of load voltage, represented by an increase in angle B over that shown in FIG. 9 will result in an increase in the IX voltage which it is recalled must, in combination with the load voltage, equal the line voltage. Since the driving force of an electrodynamic oscillating motor is proportional to the current, and since the IX voltage is the product of a fixed reactance with the current, and increase in magnitude of IX represents a corresponding increase in current and thus in driving force. It can be seen then that a perturbation which causes over-stroking will tend to increase itself, rather than damping out.

The combination of these two phenomena, off resonant decrease in amplitude and increase in driving force resulting from overstroke, tend to oppose each other. I have discovered that the decrease in amplitude due to off resonant operation has been more than compensated for by the increase in amplitude due to the electrodynamic oscillating motor. The present invention provides a solution to this inherent instability and achieves a desired variable stroke control over a wide compressor operating range.

In accordance with the foregoing described embodiment of the invention, a variable stiffness gas spring means is provided having ports adapted upon overstroking, to admit additional fluid into the gas spring cylinder to increase the natural frequency of the mechanical system and thus to oppose overstroking. The ports are so shaped that the effective cross sectional port area increases in the direction of such overstroke. Second ports are provided to equalize the increase in stiffness created by the operation of the end of stroke ports and establish a centering reference.

Upon overstroking the stiffness of the resonant system tends to decrease due to the reduction in stiffness of the spring restoring force provided by the valved working cylinder. If uncorrected, this decrease in frequency produces an increase in the angle through which displacement lags driving fore, and a commensurate increase in the angle through which the load voltage lags the current. This increase in lag of load voltage behind current causes an increase in the reactive voltage of the motor and an increase in current and therefore in driving force.

The invention opposes this action by admitting additional fluid to the gas spring cylinder of the piston in the overstroked position. At the subsequent midstroke porting position the pressure in the two gas springs equalizes at a higher value than before overstroking. This increase tends to counter the drop in stiffness of the valved working cylinders and therefore raise the resonant frequency of the mechanical system. The raised resonant frequency decreases the angle through which displacement of the piston lags the driving force, and consequently decreases the angle through which the load voltage lags the current. This causes a decrease in reactive voltage IX with a corresponding decrease in the current I, which in turn results in a reduction in driving force. Thus the overstroking is controlled.

Figure 11:
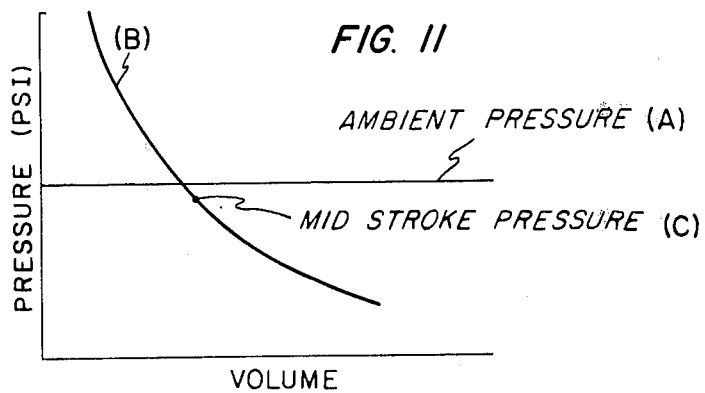
FIG. 11 is a graphical representative of a gas spring operating curve for a particular ambient pressure showing the midstroke pressure.

Referring now to FIG. 11, the ambient pressure in the compressor is indicated (A) as is the locus of adiabatic pressure volume parameters for the gas spring cylinder (B). Normally the conditions in the gas spring cylinder at midstroke (C) will be somewhat below the ambient pressure (A). This is due to the fact that the cylinder-piston combination does not form a perfect seal. When the pressure in the cylinder exceeds ambient pressure, as during compression, gas will leak from the cylinder. When the ambient pressure exceeds the cylinder pressure, as during decompression, gas will leak into the cylinder. In the steady-state condition, the sum of these leakages will be zero. The rate of leakage is proportional to the pressure differential and since the slope of the pressure-volume curve is monotonically decreasing as the volume decreases, the volume of leakage during compression will be greater than during decompression. For this reason the pressure at midstroke will fall below the ambient pressure.

Under certain operating conditions the overstroking compensation will occur continuously. Consider for example operation at an ambient pressure below the nominal design value. Since the pressure in the working cylinders will tend to be low, overstroking will occur, and porting will admit additional fluid to the gas spring cylinders increasing their stiffness. This is a normal mode of operation for low ambient pressure conditions. The design of the gas springs is such that the minimum pressure, occurring at the "bottom dead center" position is lower than the lowest expected ambient pressure. This allows effective porting even at low ambient pressures, allowing midstroke pressure to be maintained at the design value. The stiffness of the system is maintained at a value sufficient to maintain the natural resonant frequency at the value of the power line frequency and the stroke length and output of the compressor remain close to their design values.

In applications where compressor input varies through a wide range of pressure, it is usually desirable to have the stroke increase with decreasing pressure to maintain a more uniform mass flow and power input. This is an inherent trend with a constant area port. For example, as ambient pressure drops the gas spring means leaks more and has less pressure differential between ambient and the "bottom dead center" position of the gas spring to drive flow through the control port means 55. Under such conditions the stroke tends to stretch out so as to get sufficient inflow to maintain the required gas spring stiffness for matchpoint operation.

In accordance with the present invention this trend is altered in a desired manner by providing that control port means 55 exhibit a cross sectional area which increases in the direction of increasing stroke beyond a predetermined "normal" operating stroke length.

Figure 12:
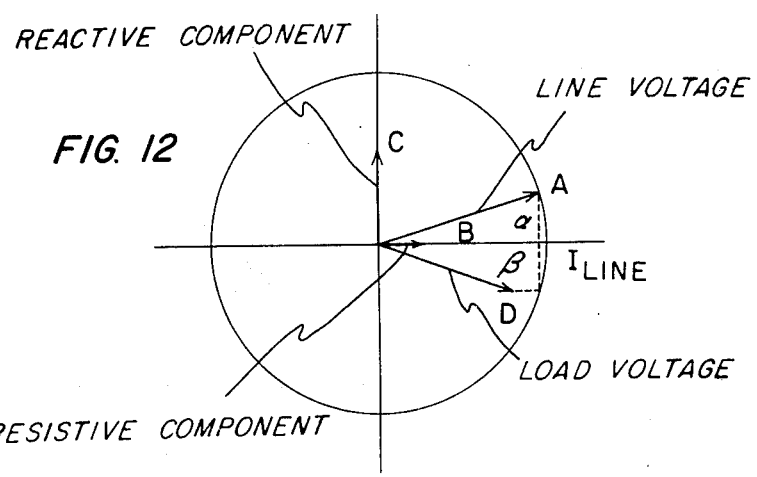
FIG. 12 is yet another vector representation of the relationship among the various voltages and currents of the compressor.

The present invention provides as an additional advantage over the prior art means for obtaining a nearly optimum power factor. FIG. 12 shows the vectorial relationships among the line voltage A, the IR drop B, the IX voltage C, and the load voltage D. The cosine of the angle α between the line voltage and the line current is conventionally defined as the power factor. The angle B between the load voltage and the line current is dependent upon the variable stiffness gas spring, and is therefore subject to be determined in the design of the compressor. Preferably the angle α will be constrained to vary in the range of −2° to +25° in the particular embodiment of the invention illustrated. Note that since line voltage A is the sum of load voltage D, IR drop B and IX voltage C, and since the relative phases of the IR voltage and the IX voltage are relatively constant with respect to the line current, selection of the angle α will determine the angle B and therefore the power factor.

While the power factor may be any desired value by the application of this invention, considerations of increased motor size make it preferable that the power factor be limited to about 0.9.

Although there has been described herein what is considered at present to be the preferred embodiments of the invention, many modifications and changes may occur to those skilled in the art. Therefore, it is intended that the appended claims cover all such modifications and changes as fall within the true spirit and scope of the invention.

What is claim and desired to be secured by Letters Patent of the United States is:

1. In an apparatus wherein a movable mass is arranged with gas spring means to form an oscillating system with an oscillating driving means, the combination with such apparatus comprising:
 means responsive to the amplitude of oscillation of said oscillating system for varying the natural frequency of said oscillating system by varying the stiffness of said gas spring means, said means including port means operative to communicate said gas spring means with a source of fluid at higher pressure whenever the amplitude of oscillation exceeds a predetermined normal operating level, said port means being so selected, arranged and shaped that the area thereof which is disposed in communication with said source of fluid at higher pressure increases non-linearly with increase in oscillation amplitude beyond said predetermined normal operating level.

2. The apparatus recited in claim 1 wherein said oscillating driving means is an electrodynamic oscillating motor.

3. The apparatus recited in claim 1 wherein said port means comprises a plurality of openings.

4. The apparatus recited in claim 1 wherein said port means comprises one or more openings of generally triangular configuration.

5. The apparatus recited in claim 1 wherein said port means comprises one or more groups of openings, each group including a plurality of openings.

6. The apparatus recited in claim 5 wherein at least some of said openings are of different cross sectional area.

7. The apparatus recited in claim 6 wherein each group of openings includes a first opening of small cross-sectional area and an opening of larger cross-sectional area spaced-apart from the first opening in the direction of increase in oscillation amplitude beyond said predetermined normal operating level.

8. The apparatus recited in claim 1 wherein said movable mass includes a fluid compressing means.

9. The apparatus recited in claim 8 wherein said fluid compressing means is a piston.

10. The apparatus recited in claim 9 wherein said port means are controlled by the position of said piston.

11. The apparatus recited in claim 8 wherein said fluid compressing means is a piston arranged to facilitate within a cylinder and wherein said port means are disposed in said piston and controlled by the position of said piston in said cylinder.

12. The apparatus recited in claim 11 wherein said port means comprises one or more openings of a generally triangular configuration.

13. The apparatus recited in claim 11 wherein said port means comprises a plurality of openings.

14. The apparatus recited in claim 11 wherein said port means comprises one or more groups of openings, each group including a plurality of openings.

15. The apparatus recited in claim 11 wherein each group of openings includes an opening of a first cross-sectional area and a second opening of a larger cross-sectional area spaced from said first opening in the direction of increase in oscillation amplitude beyond said predetermined level.

16. The apparatus recited in claim 11 wherein said oscillating driving means is an electrodynamic oscillator motor.

17. In an apparatus wherein a movable mass is arranged with gas spring means to form an oscillating system with an oscillating driving means, the combination with such apparatus comprising:
  a. piston means coupled to and adapted to be driven by said oscillating driving means; and
  b. means responsive to the position of said piston means for controlling the amplitude of oscillation of said oscillating system, said means including first port means carried by said piston means and being operative to communicate said gas spring means with a source of gas at higher pressure whenever said piston means exceeds a predetermined normal operating stroke position so tha fluid flows from said source into said gas spring means increasing the pressure therein and the stiffness thereof, said port means being so selected, arranged and shaped that the area thereof which is disposed in communication with said source of fluid at higher pressure increases non-linearly with increase in oscillation amplitude beyond said predetermined normal operating position.

18. The apparatus recited in claim 17 wherein said gas spring means comprises a pair of oppositely disposed enclosed cavities and second porting means carried by said piston means are operative to interconnect said enclosed cavities at the midstroke position of said piston means to equalize the pressures in said cavities and establish a centering reference.

19. The apparatus recited in claim 17 wherein said first port means comprises a plurality of openings.

20. The apparatus recited in claim 17 wherein said first port means comprises one or more openings of a generally triangular configuration.

21. The apparatus recited in claim 17 wherein said oscillating driving means is an electrodynamic oscillating motor.

22. In a compressor wherein piston means coupled to and adapted to be driven within a selectively valved working cylinder by an electrodynamic oscillating motor substantially in synchronism with an A-C power source and oppositely disposed enclosed volumes of gas acting as resilient means coact with said piston means and with said motor to form a mechanical resonant system having a natural frequency approximately equal to the frequency of said A-C power source and including means responsive to the position of said piston for controlling the force output of said motor to provide stable operation over varying compressor load conditions by varying the natural frequency of said resonant system and which means includes first port means communicating said enclosed volumes of gas with each other at an intermediate stroke position of said piston to equalize the gas pressures in said enclosed volumes during operation and second port means communicating one of said enclosed volumes of gas with a source of gas at higher pressure whenever said piston exceeds a predetermined normal operating stroke position so that gas flows from said source into said enclosed volume increasing the gas pressure therein and effecting an increase in the stiffness of the resilient means and thereby increasing the resonant frequency of said mechanical resonant system, the combination with said compressor of:
  said second port means shaped to effect an non-linear increase in gas flow from said source of fluid at higher pressure to said enclosed volume of gas as a function of increase in piston travel beyond said predetermined normal operating stroke position.

23. The apparatus recited in claim 22 wherein said second port means comprises a plurality of openings.

24. The apparatus recited in claim 22 wherein said second port means comprises one or more openings of generally triangular configuration.

* * * * *

UNITED STATES PATENT AND TRADEMARK OFFICE
CERTIFICATE OF CORRECTION

PATENT NO. : 4,067,667
DATED : January 10, 1978
INVENTOR(S) : Harlan Vernon White It is certified that error appears in the above-identified patent and that said Letters Patent are hereby corrected as shown below:

Col. 2, line 54, "volages" should read --voltages--.
Col. 5, line 45, "40" should read --49--.
Col. 6, line 2, delete first "be".
Col. 6, line 20, "and" should read --or--.
Col. 7, line 59, "incursh" should read --incurs--.
Col. 7, line 61, "is" should read --it--.
Col. 9, line 19, "oscillator" should read --oscillating--.
Col.12, lines 60 and 61, "facilitate" should read --oscillate--.
Col.13, lines 11 and 12, "oscillator" should read --oscillating--.

Signed and Sealed this

Thirteenth Day of June 1978

[SEAL]

Attest:

RUTH C. MASON
Attesting Officer

DONALD W. BANNER
Commissioner of Patents and Trademarks